United States Patent [19]
Tanaka et al.

[11] Patent Number: 6,067,819
[45] Date of Patent: May 30, 2000

[54] METHOD FOR MANUFACTURING GLASS CONTAINER AND APPARATUS THEREFOR

[75] Inventors: Gentaro Tanaka; Takeshi Tonegawa; Yuuich Kogure; Naoya Takagi, all of Mobara, Japan

[73] Assignee: Futaba Denshi Kogyo Kabushiki Kaisha, Mobara, Japan

[21] Appl. No.: 09/137,694

[22] Filed: Aug. 21, 1998

[30] Foreign Application Priority Data

Sep. 3, 1997 [JP] Japan ................................. 9-238460

[51] Int. Cl.$^7$ .............................. C03B 11/10; C03B 11/12
[52] U.S. Cl. ...................... 65/26; 65/24; 65/67; 65/106; 65/120; 65/272; 65/273; 425/407; 425/408; 425/412
[58] Field of Search .................................. 65/24, 26, 67, 65/106, 272, 273, 288, 289, 290, 319, 355, 356; 425/407, 408, 412

[56] References Cited

U.S. PATENT DOCUMENTS

| | | |
|---|---|---|
| 735,796 | 8/1903 | Mygatt ........................................... 65/67 |
| 925,824 | 6/1909 | Mygatt ........................................... 65/67 |
| 3,600,150 | 8/1971 | Rougeux ....................................... 65/268 |
| 3,825,413 | 7/1974 | Schwartz ....................................... 65/61 |
| 4,606,749 | 8/1986 | Nushi et al. ................................. 65/106 |
| 4,711,654 | 12/1987 | Iida ............................................ 65/172 |
| 4,983,205 | 1/1991 | Kuster et al. ............................... 65/290 |

FOREIGN PATENT DOCUMENTS 7-64572  1/1995  Japan .

*Primary Examiner*—Sean Vincent
*Attorney, Agent, or Firm*—Oblon, Spivak, McClelland, Maier & Neustadt, P.C.

[57] ABSTRACT

A method for manufacturing a glass container and an apparatus therefor capable of providing the container by pressing of a glass substrate using a die while keeping the glass substrate uniformly heated and softened. The glass substrate is heated while being kept lifted from a lower mold of a forming die and then subject to integral forming by the forming die. This permits the glass substrate to be integrally formed into the glass container in the form of a finished product, resulting in the number of steps and time required for processing being reduced.

6 Claims, 3 Drawing Sheets

METHOD FOR MANUFACTURING GLASS CONTAINER AND APPARATUS THEREFOR

BACKGROUND OF THE INVENTION

1. Field of the Invention

This invention relates to a method for manufacturing a glass container and an apparatus therefor, and more particularly to a method for manufacturing a seamless glass container used for a display device and an apparatus therefor.

2. Discussion of the Background

Manufacturing of a container used as an envelope or a getter box for a display device such as a fluorescent display device has been conventionally carried out according to such an assembling procedure as shown in FIGS. 4(a) to 4(e).

More particularly, first a glass plate of a large size is cut into a bar-like glass piece 31 of predetermined dimensions and a rectangular glass piece 32 of a predetermined dimensions, as shown in FIG. 4(a). Then, the bar-like glass piece 31 is coated on one surface thereof with a seal glass material 33, followed by calcination as shown in FIG. 4(b). Likewise, the rectangular glass piece 32 is coated on an outer peripheral edge thereof with the seal glass 33, followed by calcination.

Then, a frame of a shape corresponding to an outer configuration of the rectangular glass piece 32 is manufactured. This is carried out by cutting the bar-like glass piece 31 into two long-length glass pieces 31a of predetermined dimensions and two short-length glass pieces 31b of predetermined dimensions as shown in FIG. 4(c). Then, the long-length glass pieces 31a and short-length glass pieces 31b are combined with each other to form a frame 34 as shown in FIG. 4(d).

Thereafter, the frame 34 thus formed is arranged on the outer peripheral edge of the glass piece 32 and then the frame 34 and glass piece 32 are fixed together by means of a fixture while being kept aligned with each other, followed by calcination. This permits melting of the seal glass 33, leading to fixing between the frame 34 and the glass piece 32, so that a glass container 35 may be finished which has an opening 35a formed on one surface thereof as shown in FIG. 4(e).

Unfortunately, it was found that the assembling procedure shown in FIGS. 4(a) to 4(e) has problems.

More particularly, the assembling procedure uses the seal glass for bonding the glass pieces 31a and 31b and the glass piece 32 to each other. The seal glass generates foam, resulting in possibly causing leakage through the glass container.

Another disadvantage of the assembling procedure is that the procedure requires three members different in size or the glass pieces 31a, 31b and 32, to thereby increase the number of times of change-over of a cutting machine and render an installation therefor complicated and large-sized.

A further problem is that use of the seal glass 33 causes the seal glass melted to be adhered to a surface of the glass pieces.

Also, the procedure increases the number of steps for the assembling, to thereby increase the manufacturing cost.

Still another problem of the procedure increases the number of tools depending on a production capacity.

Another method for manufacturing a glass container by means of a forming die made of a carbon material having a coefficient of expansion similar to glass is also proposed as disclosed in Japanese Patent Publication No. 64572/1995.

However, the proposed method using the forming die has a disadvantage that the forming die is highly worn with an increase in softening temperature of glass, to thereby be deteriorated in durability thereof, because it is made of carbon. Also, it encounters another problem of rendering uniform heating of whole glass highly difficult because the glass is subject to repeated heating and cooling while being placed in a continuous oven or furnace. In particular, processing of glass increased in softening point causes time to be required for heating top and lower molds of the forming die, so that energy efficiency is substantially deteriorated and much time is required for formation of the glass container.

SUMMARY OF THE INVENTION

The present invention has been made in view of the foregoing disadvantages of the prior art.

Accordingly, it is an object of the present invention to provide a method for manufacturing a glass container which is capable of uniformly heating a glass substrate for processing thereof.

It is another object of the present invention to provide a method for manufacturing a glass container which is capable of decreasing the number of steps required for the manufacturing.

It is a further object of the present invention to provide a method for manufacturing a glass container which is capable of reducing time required for the manufacturing.

It is still another object of the present invention to provide an apparatus for manufacturing a glass container which is capable of uniformly heating a glass substrate for processing thereof.

It is another object of the present invention to provide an apparatus for manufacturing a glass container which is capable of decreasing the number of steps in the manufacturing, to thereby reduce time required for the manufacturing.

In accordance with one aspect of the present invention, a method for manufacturing a glass container is provide. The method includes the steps of providing an upper mold having a projection formed into dimensions and a configuration substantially identical with those of an inner hollow section of a glass container which has a frame integrally formed on an outer edge thereof and is in the form of a finished product, providing a lower mold having a cavity formed into dimensions and a configuration substantially identical with outer dimensions and a configuration of the glass container and arranged opposite to the upper mold, heating a glass substrate to a softening temperature thereof or more while keeping the glass substrate lifted by a predetermined distance from the lower mold, and moving the upper mold of a predetermined temperature or the lower mold of a predetermined temperature to subject the glass substrate to pressing, to thereby form the glass container.

In a preferred embodiment of the present invention, the glass substrate is supported by means of support pins arranged in the lower mold while being urged so as to be retractable with respect to the lower mold.

In a preferred embodiment of the present invention, the upper mold and lower mold are made of metal or ceramic decreased in coefficient of thermal expansion.

In a preferred embodiment of the present invention, the upper mold and lower mold are heated and cooled at temperatures lower than a softening point of the glass substrate.

In a preferred embodiment of the present invention, the glass substrate is subject on a surface thereof facing the lower mold to a release treatment by sand blast or SiN coating.

In a preferred embodiment of the present invention, the upper mold and lower mold each are formed on a surface thereof facing the glass substrate with a release material.

In accordance with another aspect of the present invention, an apparatus for manufacturing a glass container is provided. The apparatus includes an upper mold having a projection formed into dimensions and a configuration substantially identical with those of an inner hollow section of a glass container which has a frame integrally formed on an outer edge thereof and is in the form of a finished product, a lower mold having a cavity formed into dimensions and a configuration substantially identical with outer dimensions and a configuration of the glass container and arranged opposite to the upper mold, a substrate support mechanism arranged in the lower mold so as to be retractably urged with respect to the lower mold and support a glass substrate thereon while lifting it by a predetermined distance from the lower mold, a direct-acting mechanism for vertically moving one of the upper mold and lower mold, and a heating means for individually heating the upper mold, lower mold and glass substrate.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, the present invention will be described hereinafter with reference to FIGS. 1 to 3.

Figure 1:
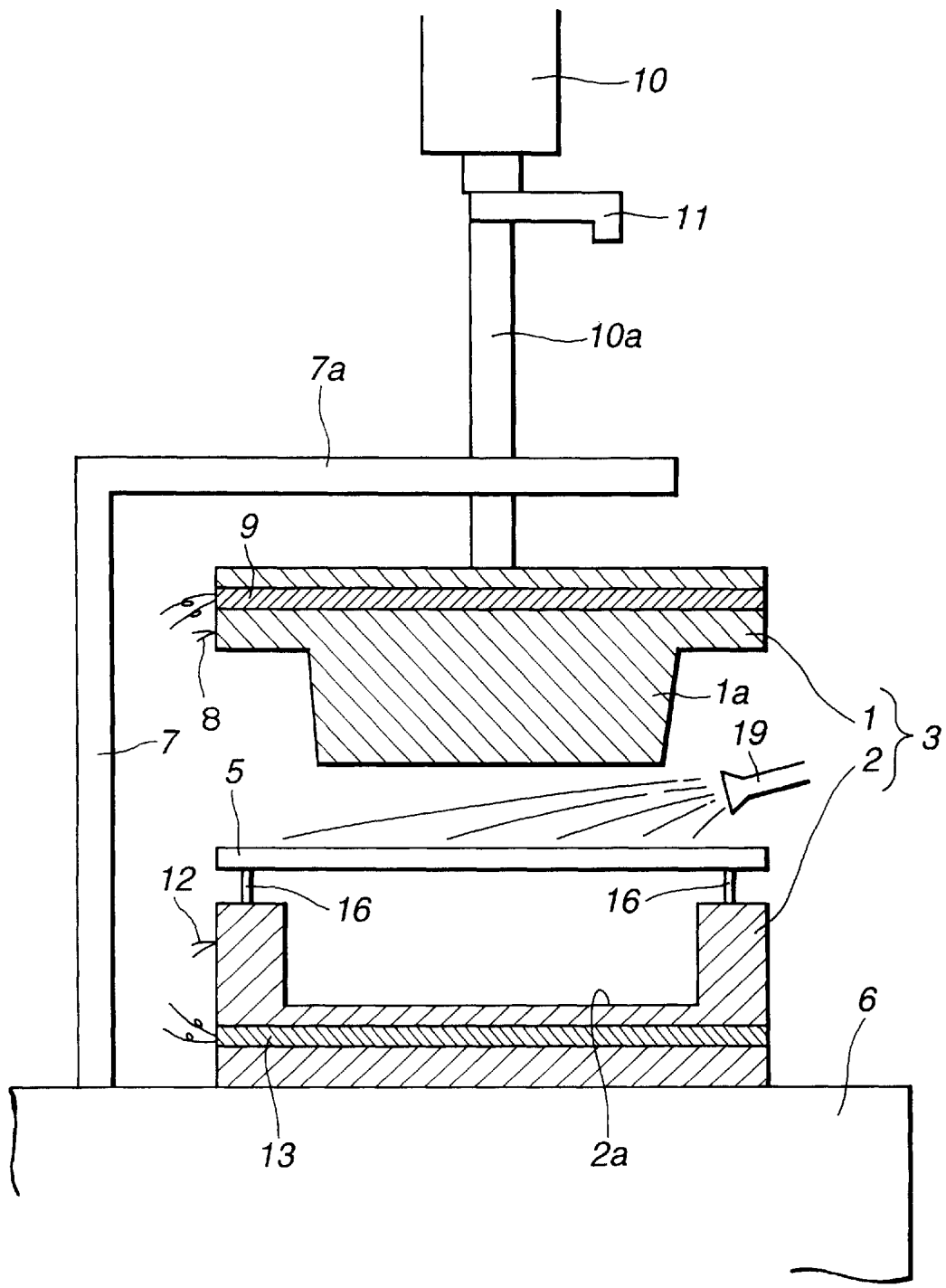
FIG. 1 is a schematic sectional view showing an embodiment of an apparatus for manufacturing a glass container according to the present invention.
Figure 2:
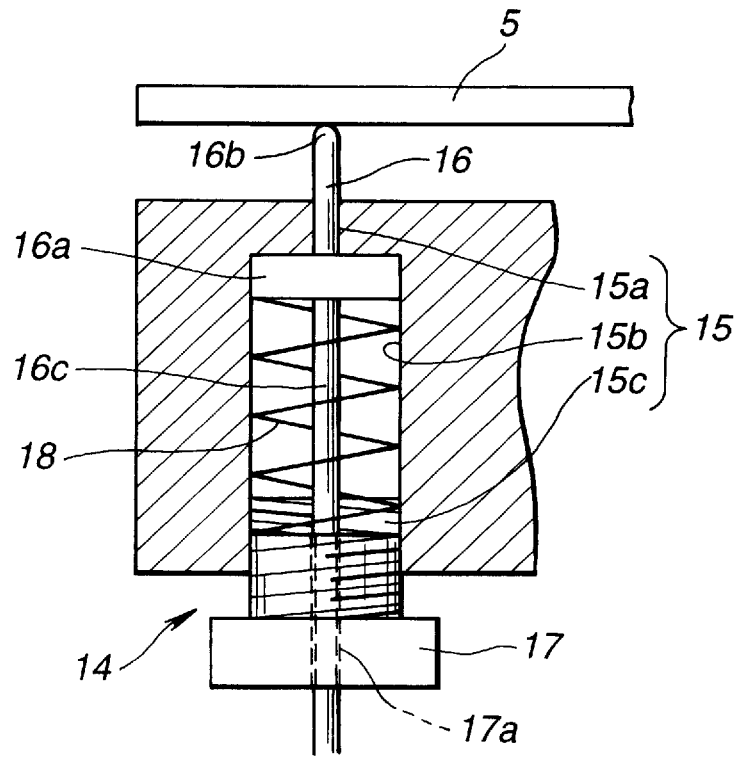
FIG. 2 is a fragmentary enlarged sectional view showing a substrate support mechanism incorporated in the apparatus shown in FIG. 1.

Referring to FIGS. 1 and 2, an embodiment of an apparatus for manufacturing a glass container according to the present invention is illustrated. An apparatus of the illustrated embodiment includes a die 3 constituted of an upper mold 1 and a lower mold 2 and adapted to form such a glass container 4 as shown in FIG. 3.

Figure 3:
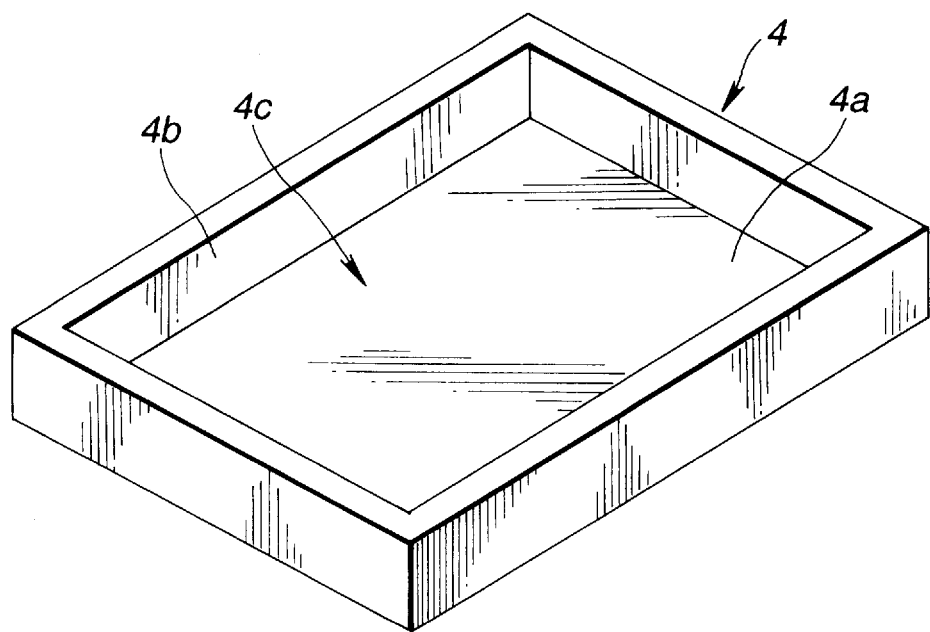
FIG. 3 is a perspective view showing a glass container in the form of a finished product manufactured by the apparatus of FIG. 1.
Figure 4A:
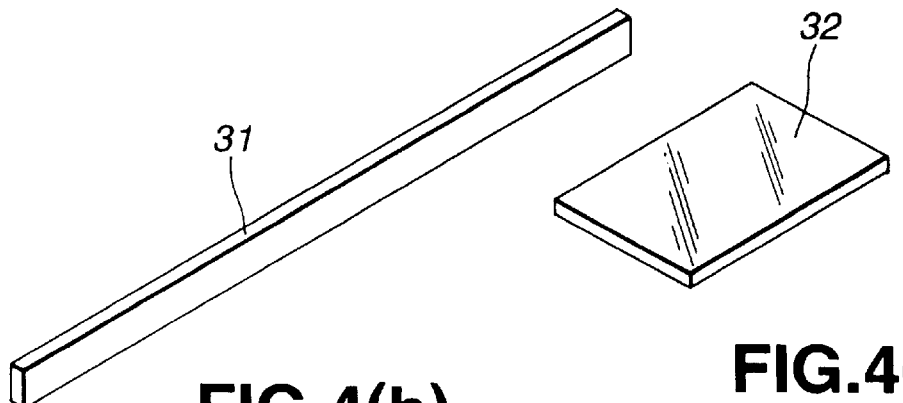
FIGS. 4(a), 4(b), 4(c), 4(d) and 4(e) each are a schematic perspective view showing each of steps in a conventional assembling procedure of assembling a glass container.
Figure 4B:
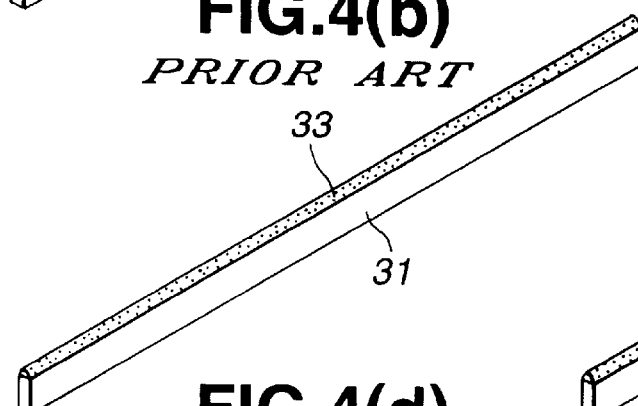
Figure 4C:
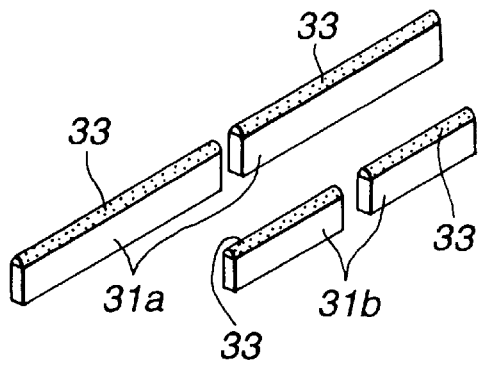
Figure 4D:
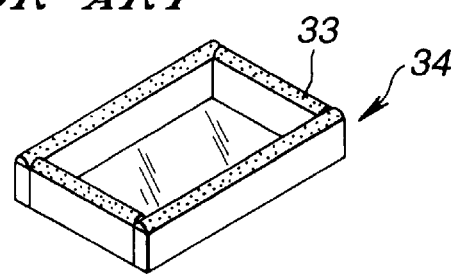
Figure 4E:
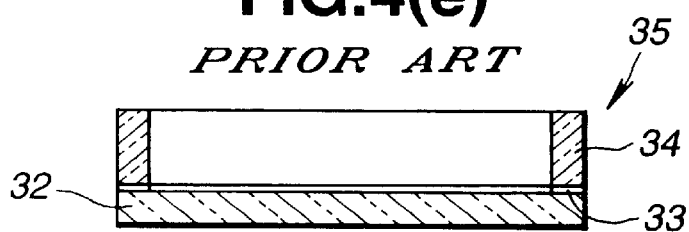

The glass container 4 in the form of a finished product, as shown in FIG. 3, includes a flat section 4a and a frame 4b integrally formed on an outer peripheral edge of the flat section 4a, to thereby define therein an inner hollow section 4c which is open on one surface of the container. The glass container 4 is formed of a single glass substrate 5 by means of the die 3.

The upper mold 1, as shown in FIG. 1, is supported on a frame 7 of an inverted L-shape arranged so as to upwardly extend from a horizontal base 6. Also, it is arranged so as to be vertically movable above the base 6. The upper mold 1 includes a projection 1a arranged on a side thereof facing the lower mold 2 and formed into outer dimensions and an outer configuration substantially identical with dimensions and a configuration of the inner hollow section 4c of the glass container 4. The upper mold 1 is provided thereon with a detection terminal or temperature measuring contact of a thermocouple 8 connected to a measure circuit (not shown) in a manner to be contacted therewith.

The upper mold 1 is detachably provided therein with a cartridge-type heater 9. The heater 9 is subject to temperature control through a control unit (not shown) depending on a temperature of the upper mold 1 detected by the thermocouple 8. The upper mold 1 is heated and cooled at temperatures below a softening point of the glass substrate 5 by temperature control to which the heater 9 is subject. More specifically, supposing that a softening point of the glass substrate 5 is 915° C., a temperature at which the upper mold 1 is heated is controlled to be 650 to 705° C. and that at which the it is cooled is set at a level lower by about 100° C. than the heating temperature or the temperature at which it is heated.

The upper mold 1 is mounted on the base 6 through an air cylinder 10 functioning as a direct-acting mechanism. The direct-acting mechanism may be constituted of a hydraulic cylinder rather than the air cylinder. The upper mold 1 is vertically moved with respect to the lower mold 2 through actuation of the air cylinder 10 while being guided by a guide pin (not shown) arranged between the upper mold 1 and the lower mold 2. The air cylinder 10 includes a rod 10a for vertically moving the upper mold 1, which is mounted thereon with a stopper 11. The stopper 11 is abutted against a horizontal surface 7a of the frame 7 parallel to the upper mold 1 and lower mold 2 to keep the upper mold 1 from being further lowered when the projection 1a of the upper mold 1 is fitted in a cavity 2a of the lower mold 2 described hereinafter, until the air cylinder 10 is driven to form the glass container 4.

The lower mold 2, as shown in FIG. 1, is mounted on the base 6 in a manner to be opposite to the upper mold 1. The cavity 2a of the lower mold 2 is arranged on a side of the lower mold 2 facing the upper mold 1 and formed into dimensions and a configuration substantially identical with outer dimensions and an outer configuration of the glass container 4. The lower mold 2 is provided thereon with a detection terminal or temperature measuring contact of a thermocouple 12 connected to a temperature measuring circuit (not shown) in a manner to be contacted therewith.

The lower mold 2 is detachably provided therein with a cartridge-type heater 13 acting as a heating means as in the upper mold 1. The heater 13 is subject to temperature control through a control unit (not shown) depending on a temperature of the lower mold detected by the thermocouple 12. The lower mold 2 is heated and cooled at temperatures lower than a softening point of the glass substrate 5 through temperature control to which the heater 13 is subject. More specifically, supposing that a softening point of the glass substrate 5 is 915° C., a heating temperature of the lower mold 2 is set to be 650 to 750° C. and a cooling temperature thereof is set at a level by about 100° C. lower than the heating temperature.

The lower mold 2 is provided with a substrate support mechanism 14 (FIG. 2) for supporting the glass substrate 5 thereon while lifting or raising the glass substrate 5 by a predetermined distance from a front or upper surface of the lower mold 2. The substrate support mechanism 14, as shown in FIG. 2, includes four support pins 16 respectively inserted through four vertically extending guide holes 15 formed via four portions of the lower mold 2 positioned on a circumference thereof about the cavity 2a. The support pins 16 each include a support section 16b and a guide section 16c integrally connected to each other through a plate-like regulator 16a interposedly arranged therebetween in a manner to be coaxial with each other.

The guide holes 15 each include a small-diameter hole 15a formed so as to be open at an upper end thereof to the upper surface of the lower mold 2 and a large-diameter hole 15b formed so as to downwardly extend from a lower end of the small-diameter hole 15a to a rear or lower surface of the lower mold 2 while being open at a lower end thereof to the lower surface of the lower mold 2 and communicating with the small-diameter hole 15a. The lower end of the large-diameter hole 15b which is open to the lower surface of the lower mold 2 is formed on an inner surface thereof with threads 15c, through which an adjustment bolt 17 is threadedly fitted in the lower end of the hole 15b. The adjustment bolt 17 is formed with a vertically extending through-hole 17a which permits the guide section 16c of the support pin 16 to extend therethrough. The guide section 16c of each of the support pins 16 is fitted thereon with a compression coiled spring 18 in a manner to be positioned between the regulator 16a and the adjustment bolt 17.

Normally, the support pins 16 each are arranged so that the regulator 16a is abutted at an upper surface thereof against an upper end surface of the large-diameter hole 15b, the support section 16b extends through the small-diameter hole 15a while being upwardly projected at an upper end or tip thereof from the upper surface of the lower mold 2, and the adjustment bolt 17 is fitted in the threaded lower end 15c of the large-diameter hole 15b while fitting the compression spring 18 on the guide section 16c and extending the guide section 16c via the through-hole 17a of the adjustment bolt 17.

The support pins 16 each are kept projected at the tip thereof from the upper surface of the lower mold 2 unless the upper mold 1 pressedly mold the glass substrate 5 against the lower mold 2, so that the tip of the support pin 16 projected supports the glass substrate 5 thereon. Under such conditions, the glass substrate 5 is uniformly heated to a temperature equal to a softening point thereof or more using a heating means such as, for example, a gas burner 19 or the like. Then, when the upper mold 1 is lowered in order to mold the glass substrate 5 against the lower mold 2, the support pins 16 each are forcedly lowered against elastic mold of the compression coiled spring 18 with lowering of the glass substrate 5.

Elastic mold of the compression coiled spring 18 may be suitably adjusted by varying tightening or clamping of the adjustment bolt 17 with respect to the threaded lower end 15c of the large-diameter hole 15b.

Now, manufacturing of the glass container by the apparatus of the illustrated embodiment thus constructed will be described.

First, the glass substrate 5 is placed on the support sections 16b of the support pins 16. Then, the glass substrate 5 is heated to a temperature equal to a softening point of the glass substrate 5 or more by the gas burner 19. More specifically, supposing that a softening point of the glass substrate 5 is 915° C., heating of the glass substrate is carried out at a temperature higher by tens of degrees than the softening point. At this time, the glass substrate 5 is supported by means of only the four pins 16 while being kept lifted by a predetermined distance from the lower mold 2, to thereby be kept from being contacted directly with the lower mold 2. This results in minimizing transfer of heat from the glass plate 5 to the lower mold 2 by heat conduction, to thereby ensure uniform heating of the whole glass substrate 5, leading to satisfactory softening of the glass substrate.

Thus, when the glass substrate 5 is sufficiently softened and a temperature of each of the upper mold 1 and lower mold 2 reaches a predetermined level, the air cylinder 10 is actuated to lower the upper mold 1 toward the lower mold 2. The upper mold 1 is lowered until the stopper 11 is abutted against the horizontal surface 7a of the frame 7. Concurrently, the support pins 16 are forcedly lowered by the glass substrate 5 with lowering of the upper mold 1. This results in the glass substrate 5 softened due to heating by the gas burner 19 being subject to pressing. More particularly, the glass substrate 5 softened is forced into the cavity 2a of the lower mold 2 by the projection 1a of the upper mold 1 with downward movement of the upper mold 1, so that surplus glass may be forced out to a peripheral surface of the cavity 2a of the lower mold 2 to form the frame 4b. Then, the pressing is carried out for a predetermined period of time such as, for example, 1 minute while keeping the stopper 11 abutted against the horizontal surface 7a of the frame 7, resulting in formation of the glass container 4 being attained.

The pressing described above causes the glass container 4 formed of the glass substrate 5 to be adhered to the lower mold 2. Thus, removal of the glass container 4 from the lower mold 2 is carried out after the lower mold 2 is cooled to a predetermined temperature.

The illustrated embodiment is not limited to the above. For example, it may be so constructed that pins vertically moved by a direct-acting mechanism such as an air cylinder are arranged in the lower mold 2. Such construction, when the upper mold 1 is raised, permits the pins to be pushed up by the direct-acting mechanism, resulting in the glass container 4 being upwardly removed from the lower mold 2.

In the illustrated embodiment, the glass substrate 5 is heated to a softening temperature thereof or more by means of the gas burner 19 while being kept lifted by a predetermined distance from the lower mold 2. This minimizes heat transfer from the glass substrate to the lower mold 2 by heat conduction, resulting in heating of the glass substrate 5 to a forming temperature being accomplished in a short period of time.

In formation of the glass container 4 provided in the form of a finished product, softening of the glass substrate 5 is carried out by heating using the gas burner. This eliminates a necessity of heating the upper mold 1 and lower mold 2 to the softening point or more, to thereby improve energy efficiency and reduce time required for processing as compared with the prior art using the forming die made of carbon.

Further, the illustrated embodiment permits the glass container 4 to be integrally formed by pressing using the forming die 3 constituted of the upper mold 1 and lower mold 2, to thereby eliminate leakage through the glass seal encountered in the prior art shown in FIGS. 4(a) to 4(e), leading to an improvement in quality of the glass container 4. Also, the illustrated embodiment requires no complicated and large-sized installation, decreases the number of tools, reduces capital investment and reduces a manufacturing cost, as compared with the prior art shown in FIGS. 4(a) to 4(e).

In the illustrated embodiment, for the purpose of release of the formed glass container from the forming die 3 after the pressing, the glass substrate 5 may be subject on a surface thereof facing the cavity 2a of the lower mold 2 to a release treatment such as sand blasting, SiN coating or the like. Alternatively, the upper mold 1 and lower mold 2 each may be provided on a surface thereof opposite to the glass substrate 5 with a release material.

Moreover, in the illustrated embodiment, the upper mold 1 is vertically movably arranged. Alternatively, the lower mold 2 may be vertically movable while keeping the upper mold 1 fixed.

As can be seen from the foregoing, the present invention is so constructed that the glass substrate is heated while being kept lifted from the lower mold before it is subject to pressing by the forming die. This permits the glass substrate to be formed into the glass container while being kept uniformly heated and softened, resulting in the number of steps and time required for processing being reduced.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A method for manufacturing a glass container, comprising the steps of:

providing a die having an upper mold, a lower mold, and positioning a burner between said upper mold and said lower mold, said upper mold having a projection formed with dimensions and a configuration substantially identical with those of an inner hollow section of a glass container which has a frame integrally formed on an outer edge thereof and in the form of a finished product, said lower mold having a cavity with dimensions and a configuration substantially identical with outer dimensions and a configuration of said glass container and arranged opposite to said upper mold;

supporting a glass substrate on said lower mold while keeping said glass substrate lifted by a predetermined distance from said lower mold;

heating said glass substrate to at least a softening temperature of said glass substrate by said burner;

heating said upper and lower molds to a temperature lower than a softening point of said glass substrate; and pressing said glass substrate so as to be in the shape of said glass container by moving said upper mold downwardly and pressing said glass substrate between said upper and lower molds.

2. A method as defined in claim 1, which comprises supporting said glass substrate by support pins arranged in said lower mold while being urged so as to be retractable with respect to said lower mold.

3. A method as defined in claim 1, which comprises making said upper mold and lower mold of a metal or ceramic having a decreased coefficient of thermal expansion.

4. A method as defined in claim 1, wherein said glass substrate is subjected on a surface thereof facing said lower mold to a release treatment by said blasting or SiN coating.

5. A method as defined in claim 1, wherein said upper mold and lower mold each are formed on a surface thereof facing said glass substrate with a release material.

6. An apparatus for manufacturing a glass container, comprising:

a die, said die including an upper mold having a projection with dimensions and a configuration substantially identical with those of an inner hollow section of a glass container which has a frame integrally formed on an outer edge thereof and which is in the form of finished product;

a lower mold having a cavity with dimensions and a configurations substantially identical with outer dimensions and a configuration of said glass container and arranged opposite said upper mold, said upper mold and lower mold being heated to a temperature lower than a softening point of a glass substrate from which said glass container is manufactured;

a support for a substrate arranged in said lower mold so as to be retractably urged with respect to said lower mold and support said glass substrate thereon while lifting said glass substrate by a predetermined distance form said lower mold;

a burner arranged between said upper and lower molds for heating said glass substrate to at least a softening temperature of said glass substrate; and a mechanism for vertically moving either one of said upper and lower molds with respect to the other said upper and lower molds to press said glass substrate between said upper and lower molds.

\* \* \* \* \*